United States Patent
Mullender et al.

(10) Patent No.: US 7,567,944 B2
(45) Date of Patent: Jul. 28, 2009

(54) CONTEXT BASED WORK ENVIRONMENT

(75) Inventors: Maarten Willem Mullender, Duvall, WA (US); David Paul Hill, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 98 days.

(21) Appl. No.: 11/173,579

(22) Filed: Jul. 1, 2005

(65) Prior Publication Data

US 2007/0022071 A1    Jan. 25, 2007

(51) Int. Cl.
G06F 17/00 (2006.01)
G06N 5/00 (2006.01)

(52) U.S. Cl. ....................................................... 706/45

(58) Field of Classification Search ................... 706/50, 706/53, 5, 62; 707/5; 714/26; 705/1, 9
See application file for complete search history.

(56) References Cited

U.S. PATENT DOCUMENTS

2002/0046209 A1    4/2002   DeBellis
2003/0229624 A1   12/2003   Petrisor
2004/0189704 A1    9/2004   Walsh
2004/0243631 A1*  12/2004   Walker et al. ............ 707/104.1

OTHER PUBLICATIONS

'How computers work': White, 2003, Que, pp. 9, 143.*
'Staroffice 6.0 office suite companion': Solveig, 2003, Prentice Hall.*
'Using AutoCAD 2000': House, 2000, Que Corporation, pp. 19, 26, 27, 76, 150, 172, 173, 227, 228, 705, 769.*

* cited by examiner

*Primary Examiner*—David R Vincent
*Assistant Examiner*—Peter Coughlan
(74) *Attorney, Agent, or Firm*—Workman Nydegger

(57) ABSTRACT

The present invention extends to methods, systems, and computer program products for providing a context based work environment. In some embodiments, a computer system is configured to mine relationships to capture references relevant to a context. In other embodiments, a computer system adds a reference to a context. In yet other embodiments, a computer system performs a task when focus is shifted off of the task between performance of different portions of the task. Accordingly, embodiments of the present invention promote more efficient data manipulation at a computer system and can (potentially significantly) reduce the amount of work that has to be re-performed when a worker leaves and then subsequently resumes a task.

7 Claims, 6 Drawing Sheets

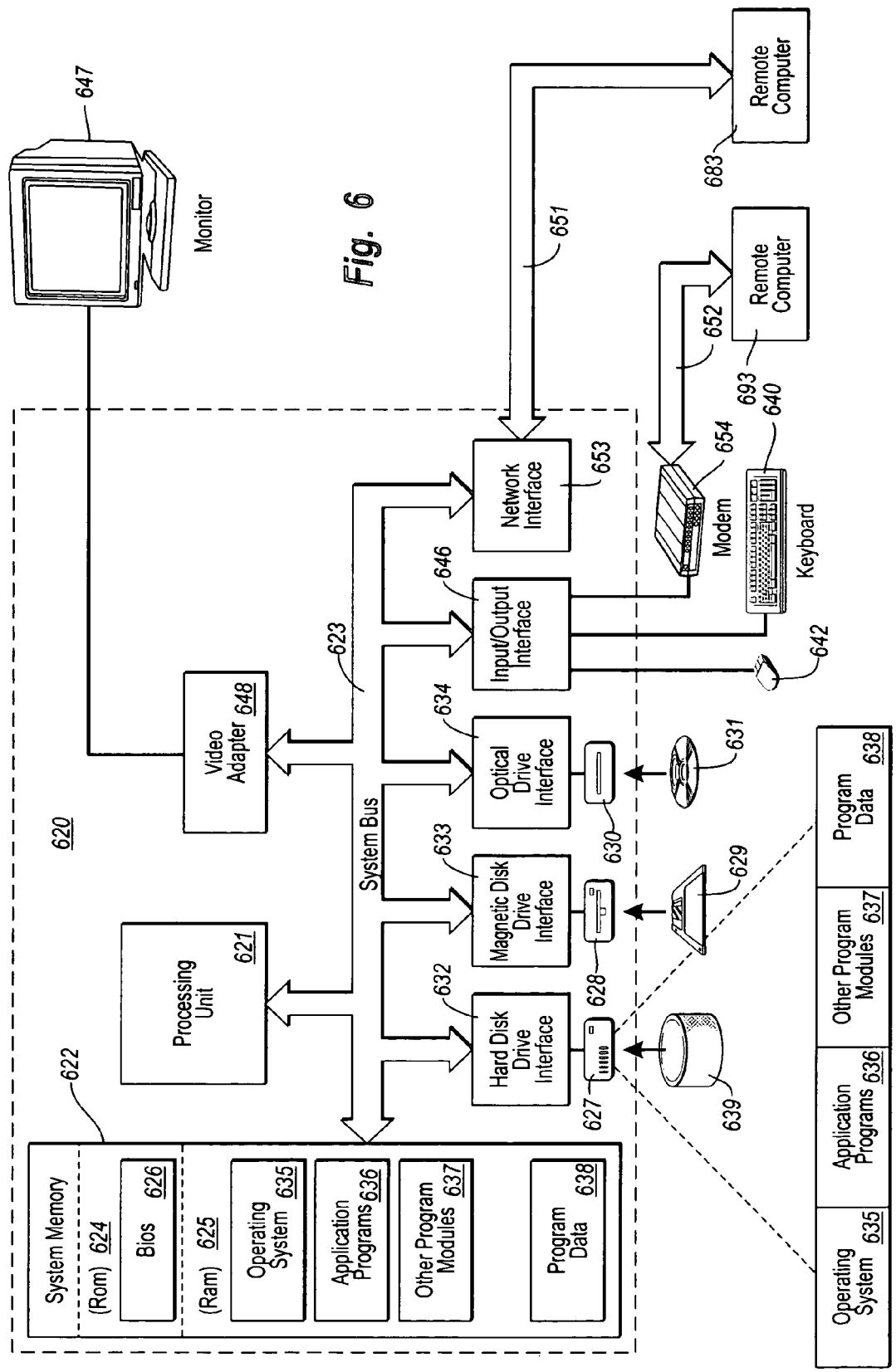

CONTEXT BASED WORK ENVIRONMENT

CROSS-REFERENCE TO RELATED APPLICATIONS

Not applicable.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

In virtually any computing environment, users often switch between differently configured components, such as, for example, different applications and/or different data. Often, these different applications and different data are relevant to one another. For example, in Line of Business ("LOB") systems references often refer to instances, such as, for example, of a specific customer, a specific order, or a specific product. Thus, in the course of preparing a customer proposal, a sales manager may want to compare a number of alternative products from various suppliers to decide on a product strategy. Accordingly, each alternative product is relevant to every other alternative product and to the customer proposal.

Often, the manipulation of different types of data through the use of different applications is part of a human-driven process initiated and understood by a user of a computer system. For example, the sales manager may access product data from different suppliers, potentially using different applications. Some product data may be obtained through electronic mail, some through Web browsing, some through telephone communication, etc. It may be the responsibility of the sales manager to then compile a summary of the customer proposal for corporate executives. However, from the perspective of a computer system that runs the applications and manipulates the data, the process is an unstructured process. That is, the process from accessing product data through different applications and then compiling a summary exists in the sales manager's mind but no formal description of the process is known to the computer system. Thus, there is typically no computer based assistance providing an overall task status or computer based guidance in coordinating applications. Accordingly, the burden for maintaining a task status and coordinating applications falls on the sales manager.

Thus, if a user has to suspend work on a human-driven process (e.g., to work on some other process), there is often no easy way to return to the point in the process where work was suspended. That is, there is typically no computer based mechanism for suspending and resuming a task that spans multiple data types, applications, etc. As a result, a user is often required to remember where they were. If a user is not precise in their remembrance, the user may be required to redo some amount of work that was previously performed. For example, when returning to customer proposed project, the sales manager may have to locate and re-review e-mails, Web pages, and phone messages to re-identify products from different suppliers.

Similar, and potentially more difficult, problems can occur when a first user performs one portion of a human-driven process and a second different user (e.g., as a result of the first user delegating responsibility) performs another portion of the human-driven process. That is, there is typically no computer based mechanism for implementing mulit-user based tasks when different portions of the task rely on different data types and different applications. As a result, the second user may have no way to know how far along in the human-driven process the first user was before the second user began working on the human-driven process. For example, the sales manager may begin work on the customer proposal and then, at some future point, delegate completion of the customer proposal to an assistant. Unfortunately, to insure that the customer proposal is correct, the assistant may have to re-perform at least some of the actions the sales manager has already performed. For example, the assistant may need to locate and re-review e-mails, Web pages, and phone messages that the sales manager has already reviewed.

Other similar problems can occur when different portions of a task rely on differently configured computer system components, such as, for example, differently configured user-interfaces, differently configured security requirements, differently configured connectivity requirements, etc. As result, a user is often forced to re-identify previously identified data and re-performed previously performed work. Re-identifying previously identified data and re-performing previously performed work is inefficient and can reduce productivity.

BRIEF SUMMARY OF THE INVENTION

The foregoing problems with the prior state of the art are overcome by the principles of the present invention, which are directed towards methods, systems, and computer program products for providing a context based work environment. In some embodiments, a computer system mines relationships to capture references relevant to a context. The computer system submits query criteria to the context through a common external behavior of the context. The common external behavior is common to the context and one or more other contexts and provides a common interface such that different applications can uniformly submit queries to the context and to the one or more other contexts.

The context internally identifies any references in the context that satisfy the query criteria in accordance with internal behavior specific to the context. The computer system determines that a second context, included in the one or more contexts, with potentially relevant references is within a relevance threshold of the context. The computer system recursively submits the query criteria to the second context through the common external behavior. The second context internally identifies any references in the second context that satisfy the query criteria in accordance with internal behavior specific to the second context.

In other embodiments, a computer system adds a reference to a context. The computer system selects a reference with a user-input device. The computer system indicates that the reference is to be included in a context. The context has a common external context behavior for receiving references that is common to the context and one or more other contexts at the computer system. The context accepts the reference in accordance with the common external behavior. The context processes the reference in accordance with internal logic. The internal logic being internal to the context and differing from the internal logic of at least one of the one or more other contexts.

In yet other embodiments, a computer system performs a task when focus is shifted off of the task between performance of different portions of the task. The computer system shifts focus (e.g., either automatically or in response to user input) to a context that includes one or more references relevant to performing a task. A first portion of the task is performed. Performance of the first portion of the task has an outcome that manipulates the configuration of one or more of the relevant references. The computer system saves the context to preserve the configuration of the one or more relevant references. The computer system shifts focus to a different context (e.g., either automatically or in response to user input) that includes different references such that focus is shifted away from the configuration of the one or more relevant references. The computer system restores the context subsequent to saving the context. A second subsequent portion of the task that depends on the outcome of the first portion of the task is performed. The second subsequent portion of the task utilizes the preserved configuration of the one or more relevant references such that performance of the first portion of the task does not have to be repeated.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 illustrates a suitable operating environment for the principles of the present invention.

DETAILED DESCRIPTION OF THE PREFERRED EMBODIMENTS

Figure 1:
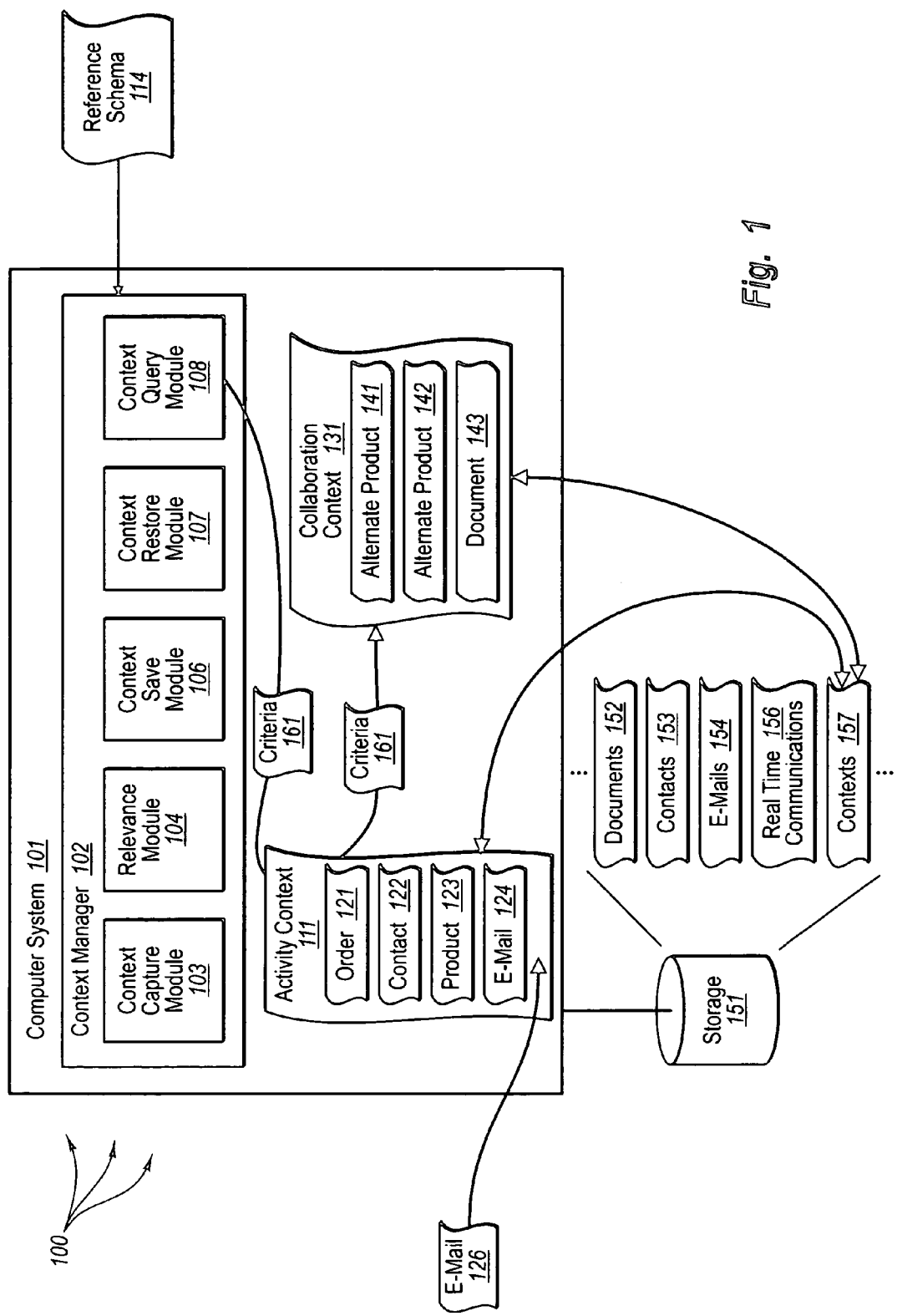
FIG. 1 illustrates an example of a computer architecture that facilitates a context based work environment.

The principles of the present invention provide for providing a context based work environment. In some embodiments, a computer system mines relationships to capture references relevant to a context. The computer system submits query criteria to the context through a common external behavior of the context. The common external behavior is common to the context and one or more other contexts and provides a common interface such that different applications can uniformly submit queries to the context and to the one or more other contexts.

The context internally identifies any references in the context that satisfy the query criteria in accordance with internal behavior specific to the context. The computer system determines that a second context, included in the one or more contexts, with potentially relevant references is within a relevance threshold of the context. The computer system recursively submits the query criteria to the second context through the common external behavior. The second context internal identifies any references in the second context that satisfy the query criteria in accordance with internal behavior specific to the second context.

In other embodiments, a computer system adds a reference to a context. The computer system selects a reference with a user-input device. The computer system indicates that the reference is to be included in a context. The context has a common external context behavior for receiving references that is common to the context and one or more other contexts at the computer system. The context accepts the reference in accordance with the common external behavior. The context processes the reference in accordance with internal logic. The internal logic being internal to the context and differing from the internal logic of at least one of the one or more other contexts.

In yet other embodiments, a computer system performs a task when focus is shifted off of the task between performance of different portions of the task. The computer system shifts focus (e.g., either automatically or in response to user input) to a context that includes one or more references relevant to performing a task. A first portion of the task is performed. Performance of the first portion of the task has an outcome that manipulates the configuration of one or more of the relevant references. The computer system saves the context to preserve the configuration of the one or more relevant references. The computer system shifts focus to a different context (e.g., either automatically or in response to user input) that includes different references such that focus is shifted away from the configuration of the one or more relevant references. The computer system restores the context subsequent to saving the context. A second subsequent portion of the task that depends on the outcome of the first portion of the task is performed. The second subsequent portion of the task utilizes the preserved configuration of the one or more relevant references such that performance of the first portion of the task does not have to be repeated.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "reference" is defined as data used to identify one or more instances of a data entity. References can include one or more data items used to identify data entities. For example, customers can be uniquely identified by tax number, DUNS number, etc. Alternately, a list of customers can be identified by zip code, region, account, manger, etc.

References can be used to formulate queries to services, such as, for example, a list of data entity attributes or a formulation of a set of conditions. A reference can include a combination of required and optional attributes. Thus, clients that have different reference information can flexibly obtain similar views of data entities and utilize the same actions through the same interfaces. A reference schema can be utilized to expose attributes and properties of data entities for identifying data entities. Thus, reference formats can be formally and generally defined.

In this description and in the following claims, a "relationship" is defined as information in one data entity that can be used to construct a reference to another data entity. For example, given a view of an order data entity (e.g., representing a purchase order) it is possible to construct a reference to a corresponding customer data entity (the customer purchasing the products in the purchase order) based on information in the order data entity. That is, the order view can be transformed into a customer reference referring to the customer data entity. Relationships can be defined using both a view schema and a reference schema. Thus, relationships are not constrained to a single service and can be used to relate data entities encapsulated in different services.

Relationships can be statically defined in metadata, such as, for example, an express reference to some data entity. For example, an order data entity can include an express reference to the customer that submitted the order. Alternately, a context manager can correlate data at run-time to derive or infer relationships between data entities (hereinafter referred to as "correlation"). For example, a service agent can determine (by parsing or some other mechanism) that the body of a document contains a reference to product data. Thus, the context manager infers that the product data is relevant to the document. Further, when multiple references are added to the same context, a context manager can correlate the multiple references to one another.

Accordingly, a combination of entities, references, and relationships can be utilized to semantically describe services. A semantic description of services can thus include data entities, their relationships to one another, as well as their behaviors. Based on a semantic description of services, relevance between data entities can be determined. Relevance can be defaulted across all users, can be role based, or based on activity.

In this description and in the following claims, a "context" is defined as an environment in which something exists or happens. A context can be viewed as a container of references that are relevant to an environment and/or task. Context can change over time as the relevancy of references relatively to an environment and/or task changes. Different types of contexts can be configured for different uses.

For example, an activity context can be configured to display references as icons on a workspace and the relationships as connecting lines. Hovering over the icons with a cursor can cause popup text to display. One mode of selecting (e.g., clicking with a mouse) replaces an icon with the popup text. Another mode of selecting (e.g., double-clicking with a mouse) opens a window for content.

A collaboration context can be configured to include and manage timelines and planning. It shows the references, where appropriate, attached to the timeline or to the planning. It may display the references as icons, as pop-ups or as windows. The references can exhibit similar behavior as in the activity context.

A document context can be configured to include entity references embedded in the text as SmartTags or icons. These icons can provide exact, up to date, information about the entities.

A Real Time Communication (RTC) context can include contact information, video, instant message conversation text, possibly a transcript of a voice conversation and an area that can be used to share (or actually communicate) references between the parties in conference. Different parties can view different information based on the same reference at the same time. They share the references, but not necessarily the behavior (e.g., my purchase order may be your sales order).

Different types of contexts can have common external behavior. For example, different types of contexts can all store references, interact with stored references, allow references to provide the same user experience across contexts, can accept new references (e.g., through drag and drop), can remove references, can receive queries, and can provide query results.

On the other hand, different types of contexts can have different internal logic. For example, different types of contexts can differ in how they interact with references, in how they structure references, in how they present reference structure, and in how they store and share context. Different types of context can also differ in how they calculate relevance. For example, a collaboration context may find recent events more relevant and may understand something about a business objective. On the other hand, a document context has no timeline and no business objective, but it may derive information from its store or from its type and use this instead. This leads to offering different navigation and different actions. In one context, products may be closely linked to suppliers, in another to ongoing projects, and in a third to general ledger accounts.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates a context based work environment. Depicted in computer architecture 100 is computer system 101. Computer system 101 can be connected to a network, such as, for example, a Local Area Network ("LAN"), a Wide Area Network ("WAN"), or even the Internet. Accordingly, computer system 101 and other network connect computer systems can receive data from and send data to other computer systems connected to a network. Accordingly, computer system 101, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, computer systems 101 can create SOAP envelopes, exchange SOAP envelopes over a network, and receive SOAP envelopes.

Computer system 101 includes context manager 102 that is generally configured to manage containers of references. Context manager 102 manages containers of references to provide a user of computer system 101 with references that are relevant to a specified context. Context manager 102 includes context capture module 103, relevance module 104, context save module 106, context restore module 107, and context query module 108. Generally, context capture module 103 is configured to capture references for a context, relevance module 104 is configured to determine the relevance of one reference to another reference, context save module 106 is configured to save a context, context restore module 107 is configured to restore a context, and context query module 108 is configured to query a context for references matching specified criteria.

Storage 151 can be virtually any type of storage devices, such as, for example, a magnetic disk or optical disk. Storage 151 can store references (data) in various different formats that are in turn utilized by various different applications at computer system 101. For example, as depicted, storage 151 stores documents 152, contacts 153, e-mails 154, real time communications 156, and contexts 157. However, it should be understood that a wide range of other types of data can also be stored at storage 151. Reference schema 114 can be utilized to expose attributes and properties of relationships between references stored at storage 151 and otherwise utilized at computer system 101.

Context manager 102 can create contexts (i.e., containers of references) that include references stored at storage 151 and maintain those contexts as contexts 157. For example, as depicted, activity context 111 includes order 121, contact 122, product 123, and e-mail 124. Context capture module 103 can utilize relationships between references to determine what references are to be captured for inclusion in a context (i.e., in a container of references). Context capture module 103 can interoperate with relevance module 104 to identify other references that have a requisite relevance to captured references. References having a requisite relevance to captured references can also be included in the context. For example, if alternate products 141 and 142 are potential alternates for product 123, relevance module 104 can determine that alternate products 141 and 142 are to be included in activity context 111.

Relevance module 104 can evaluate static metadata relationships between references and can create correlations between references (e.g., at run-time) to determine relevance. For example, relevance module 104 can create a correlation between alternate product 141 and alternate product 142 based on alternate product 141 and alternate product 142 being alternate products for product 123. Relevance module 104 can include logic to make such a determination even if there is no expressly described relationship (e.g., defined in reference schema 114) between alternate product 141 and alternate product 142. For example, relevance module 104 may detect that alternate product 141 and alternate product 142 were both identified in a search for replacements for product 123.

One metric for determining relevance includes calculating how many relationships have been followed (or the "distance") between references. A relevance threshold can be defined to indicate how related one reference is to be to another reference for the one referenced to be identified as relevant to the other reference (and thus possibly included in the same context as the first reference). In some embodiments, a relevance threshold (e.g., relevance threshold 116) is defined as a number, such as, for example, 1, 2, 3, 4, 5, etc. The distance between two references can be compared to the relevance threshold to determine if one reference is relevant to the other reference. For example, when the distance between two reference is within (e.g., is less than or equal to) the relevance threshold, relevance module 104 determines that one reference is relevant to the other reference. On the other hand, when the distance between references is not within (e.g., is greater than) the relevance threshold, relevance module determines that one reference is not relevant to the other reference.

Thus, a relevance threshold can essentially result in a perimeter around a context. References relevant to the context can be limited to those data entities within the perimeter.

However, it should be understood that a relevance threshold is not limited to numbers representing a perimeter around a requested data entity. For example, a relevance threshold can be a more complex relevance data structure including other relevance rule data, such as, for example, a user's role, a data entity type, recorded data usage, etc. A number representing a perimeter distance may or may not be combined with other relevance rule data in a relevance data structure. For example, the relevance of a relationship can be determined by a relevance algorithm. A relevance algorithm can be configured in metadata referring to a piece of executable code that can return a relevancy.

Context capture module 103 and/or relevance module 104 can include references in a context automatically. For example, in response to order 121 being captured for inclusion in activity context 111, context capture module 103 can also capture contact 122 (e.g., a sales person for order 121) and product 123 (e.g., a product included in order 121). Thus, when a user of computer system accesses order 121, other relevant references are also available.

Users can also add references to a context. For example, a user-interface can include a menu option of including a reference in a context. A menu including such a menu option can be revealed by selecting (e.g., right clicking) on a reference. Alternately, a common external behavior of contexts can be to interact with a user-interface to facilitate drag and drop addition of a reference to a context. A user can select a reference (e.g., clicking and holding down a left mouse button), drag the reference (e.g., by moving the mouse) to the context, and drop the reference (e.g., releasing the left mouse) into the context. For example, a user can drag and drop e-mail 126 (e.g., from contact 122's boss) into activity context 111. Similar techniques can be used to remove a reference from a context.

Upon receiving a reference (added automatically or by a user) the internal logic of the context (which can differ from context to context) controls how the reference is processed. For example, in a document context a reference can be represented by a smart tag or hyperlink. Alternately, in a collaborative context, a reference can be represented by an icon on an appropriate location in a timeline. User added references can be classed as highly relevant to a context.

Context save module 106 can save a context to contexts 157. For example, context save module 106 can save activity context 111 to contexts 157. An active context can be a context stored in the system memory of computer system 101. Thus, context save module 106 can save a context from system memory to storage 151. On the other hand, context restore module 107 can restore a context form contexts 157. For example, context restore module 107 can load collaboration context 131 from contexts 157. Thus, context restore module can load a saved context from storage 151 into system memory.

Context query module 108 can query contexts (i.e., containers of references) for references satisfying specified query criteria. For example, context query module 108 can submit criteria 161, such as, for example, an order number, an employee ID, a product name, etc., to activity context 111. Criteria 161 can originate from a user's manipulation of input devices (e.g., a keyboard and mouse) or at another computer system.

Context query module 108 can implement recursive queries. For example, as a result of alternate products 141 and 142 being relevant to product 123, context query module 108 may also submit criteria 161 to collaboration context 131. Context query module 108 can submit criteria 161 to other contexts having references related to references in collaboration context 131, etc. Recursion can be scoped (e.g., using a relevance threshold) such that a reasonable amount of references are returned in response to a query. For example, it may be that context query module 108 recurses to contexts that are within a distance of 1 from a context that initially received query criteria.

Query results can be returned to context query module for display at a user interface.

Figure 2:
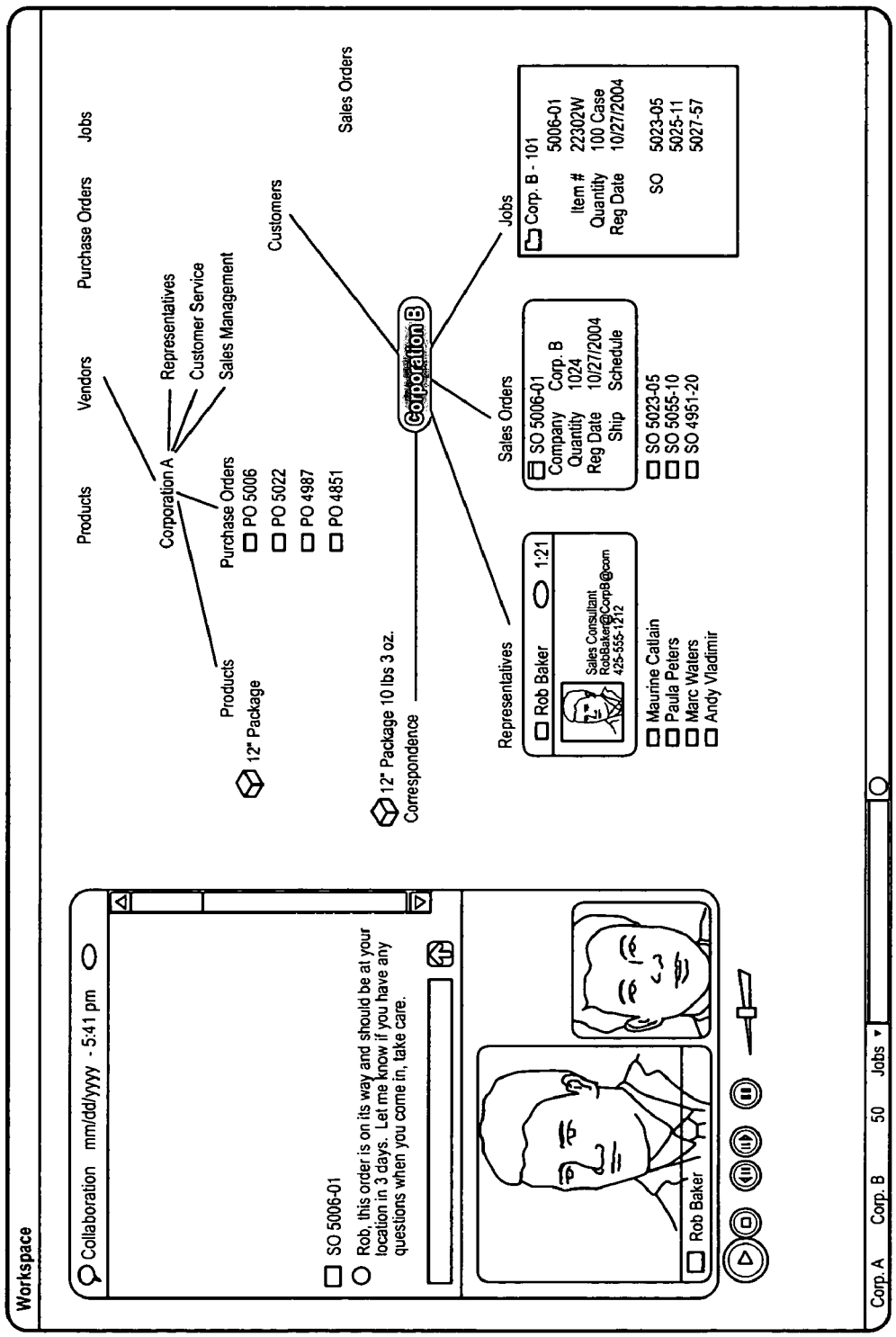
FIG. 2 illustrates an example user-interface screen of an activity context.

FIG. 2 illustrates an example user-interface screen of an activity context 200. Activity context 200 includes relevant references for order 5006 (PO 5006 for corporation A and SO 5006-01 for corporation B) from the perspective of an employee of corporation A. Context 200 shows relevant references for corporation A, including related purchase orders PO 5022, PO 4987, and PO 4851 and product Z that is included in PO 5006. Context 200 also shows relevant references for corporation B, including jobs, sales orders, representatives, and correspondence. A transcription and audio file of a voice message is also included. Thus, the employee has efficient access to relevant information for order 5006 without having to run multiple applications (e.g., a media player, purchase order application, contact viewer, etc.) and search in various different locations.

Figure 3:
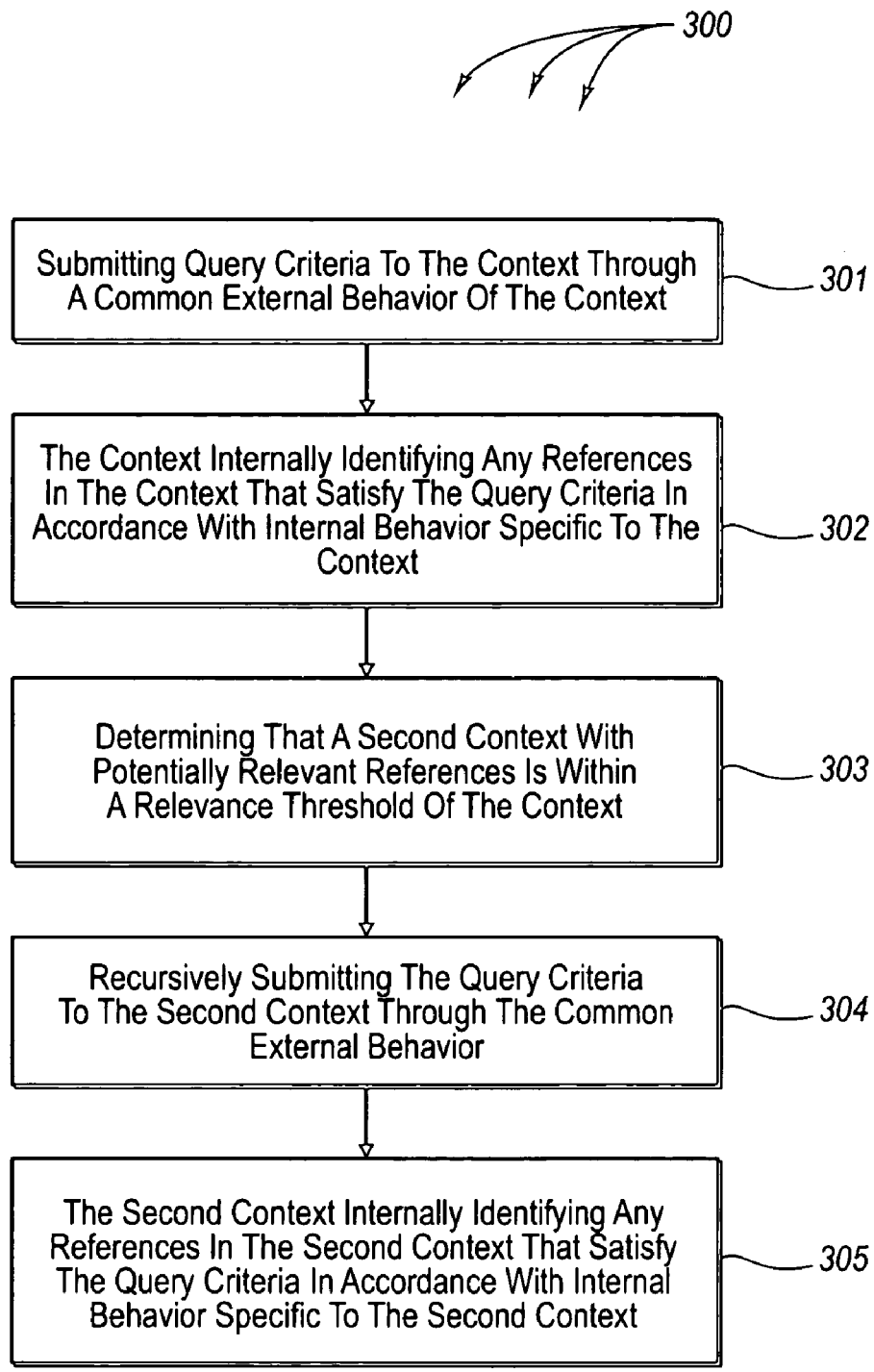
FIG. 3 illustrates an example flow chart of a method for mining relationships to capture references relevant to a context.

FIG. 3 illustrates an example flow chart of a method 300 for mining relationships to capture references relevant to a context. The method 300 will be described with respect to computer architecture 100 and activity context 200.

Method 300 includes an act of submitting query criteria to a context in accordance with a common external behavior (act 301). For example, context query module 108 can submit criteria 161 to activity context 111. It may be that activity context 111 contains some of the references depicted in activity context 200. For example, order 121 may be Sales Order SO 5006-01, contact 122 may be Rob Baker, product 123 may be product Z, etc. As previously, described, criteria 161 can include an order number, an employee ID, a product name, etc.

The common external behavior is common to the context and one or more other contexts and provides a common interface such that different applications can uniformly submit queries to the context and to the one or more other contexts. For example, activity context 111 can expose a common external behavior for receiving query criteria that is common with other contexts (e.g., collaboration context 131) at computer system 101. Applications, such as, for example, context manager 102, can thus uniformly (e.g., according to a similar or even the same data format) submit queries to activity context 111, collaboration context 131, and other contexts in contexts 157.

Method 300 includes an act of the context identifying any references in the context that satisfy the query criteria in accordance with internal behavior specific to the context (act 302). For example, activity context 111 can identify any references (e.g., order 121, contact 122, etc.) that satisfy criteria 161. Activity context 111 can process criteria 161 in accordance with internal logic that may differ from the internal logic of other contexts (e.g., collaboration context 131). Identified references can be formatted in accordance with reference schema 114 or can be unstructured references.

Activity context 111 can expose a common external behavior for returning identified references that is common with other contexts (e.g., collaboration context 131) at computer system 101. Activity context 111 can return any identified references that satisfy the query criteria 161 to context query module 108 in accordance with the common external behavior.

Method 300 includes an act of determining that a second context, included in the one or more other contexts, with potentially relevant references is within a relevance threshold of the context (act 303). For example, relevance module 104 can determine that collaboration context 131 is within relevance threshold 116 of (e.g., a single relationship is traversed to get to) activity context 111.

Method 300 includes an act of recursively submitting the query criteria to the second context through the common external behavior (act 304). For example, context query module 108 can submit criteria 161 to collaboration context 131. It may be that collaboration context 131 contains references that are relevant to references depicted in activity context 200. For example, alternate products 141 and 142 may be relevant to product Z. Collaboration context 131 can expose the common external behavior for receiving query criteria that is common with other contexts (e.g., activity context 111) at computer system 101.

Method 300 includes an act of the second context identifying any references in the second context that satisfy the query criteria in accordance with internal behavior specific to the second context (act 305). For example, collaboration context 131 can identify any references in collaboration context 131 (e.g., alternate products 141 and 142 and document 143, etc.) that satisfy criteria 161. Collaboration context 131 can process criteria 161 in accordance with internal logic that may differ from the internal logic of other contexts (e.g., activity context 111).

Collaboration context 131 can expose the common external behavior for returning identified references that is common with other contexts (e.g., activity context 111) at computer system 101. Collaboration context 131 can return any identified references that satisfy the query criteria 161 to context query module 108 in accordance with the common external behavior.

Relevance module 104 can determine if any other contexts are within relevance threshold 116 of activity context 111. These other contexts can include contexts that are the same distance from activity context 111 as collaboration context 131. These other contexts can also include contexts that are the further from activity context 111 than collaboration context 131 but that are still within relevance threshold 116. For example, when the relevance threshold 116 is traversal of two relationships, any context with one relationship traversal from collaboration context 131 would also be within relevance threshold 116. These other contexts can expose a common external behavior for receiving query criteria and returning identified references that are common with other contexts (e.g., activity context 111 and collaboration context 131) at computer system 101. However, these other contexts can process criteria 161 in accordance with internal logic that may differ from the internal logic of other contexts (e.g., activity context 111 and collaboration context 131).

Figure 4:
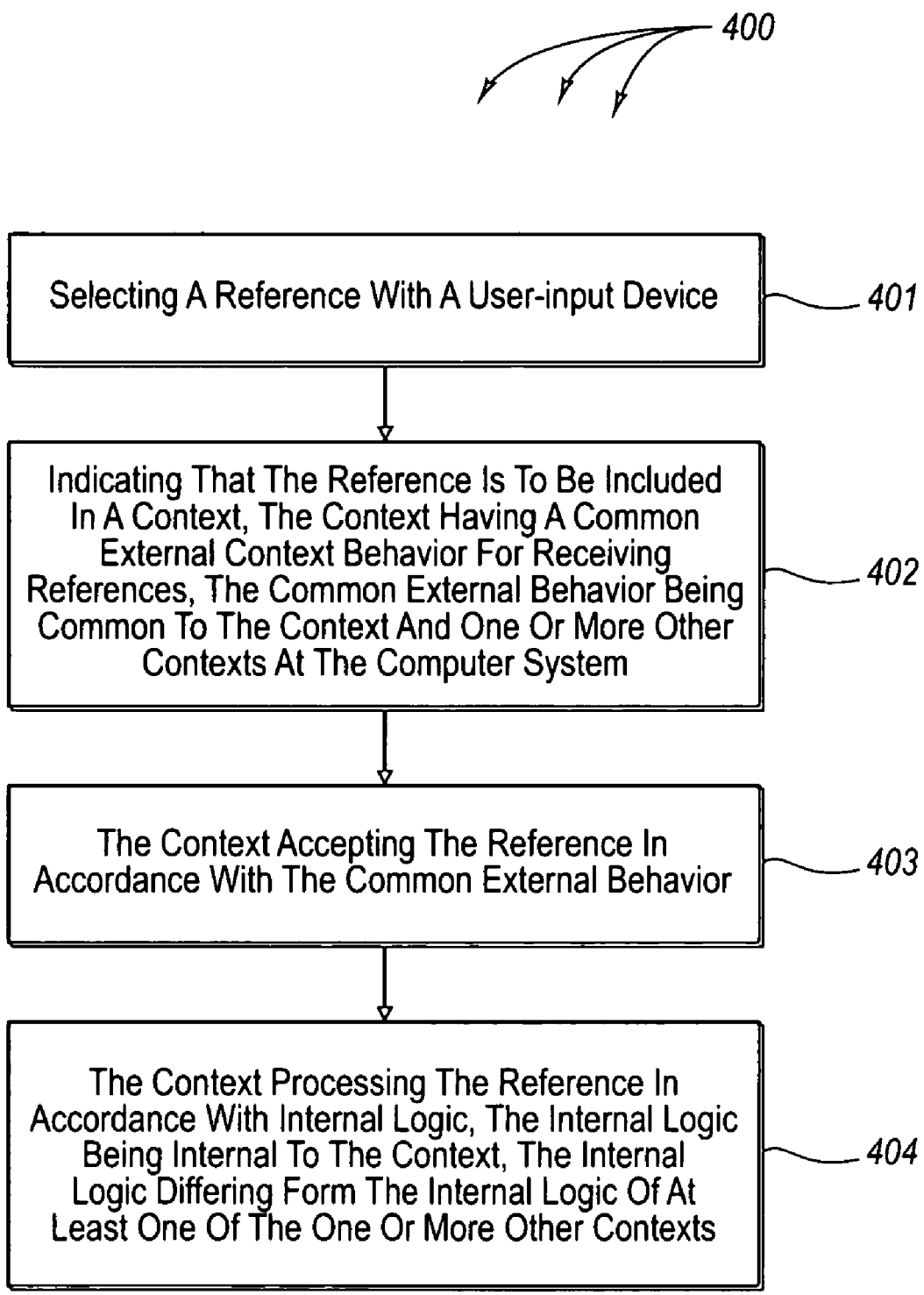
FIG. 4 illustrates an example flow chart of a method for adding a reference to a context.

FIG. 4 illustrates an example flow chart of a method 400 for adding a reference to a context. The method 400 will be described with respect to computer architecture 100.

Method 400 includes an act of selecting a reference with a user-input device (act 401). For example, a user of computer system 101 can use a keyboard and/or mouse to select an icon representing e-mail 126.

Method 400 includes an act of indicating that the reference is to be included in a context having a common external context behavior for receiving references (act 402). The common external behavior is common to the context and one or more other contexts at the computer system. For example, a user of computer system 101 can drag the icon representing e-mail 126 to activity context 111. Alternately, a user of a computer system can select a menu option associated with e-mail 126 to indicate that e-mail 126 is to be included in activity context 111. Activity context 111, collaboration context 131, and other contexts in contexts 157 can have a common external behavior for receiving references.

Method 400 includes an act of the context accepting the reference in accordance with the common external behavior (act 403). For example, activity context 111 can accept e-mail 126 in accordance with the external behavior common to activity context 111, collaboration context 131, and other contexts in contexts 157. It may be that the icon representing e-mail 126 that was previously dragged to activity context 111 is subsequently dropped into activity context 111. Alternately, as a result of a menu selection activity context 111 can accept e-mail 126.

Method 400 includes an act of the context processing the reference in accordance with internal logic (act 404). For example, activity context 111 can process e-mail 126 in accordance with logic contained in activity context 111. A context's internal logic can differ from the internal logic of other contexts. For example, the internal logic contained in activity context 111 can differ from the internal logic contained in collaboration context 131.

Figure 5:
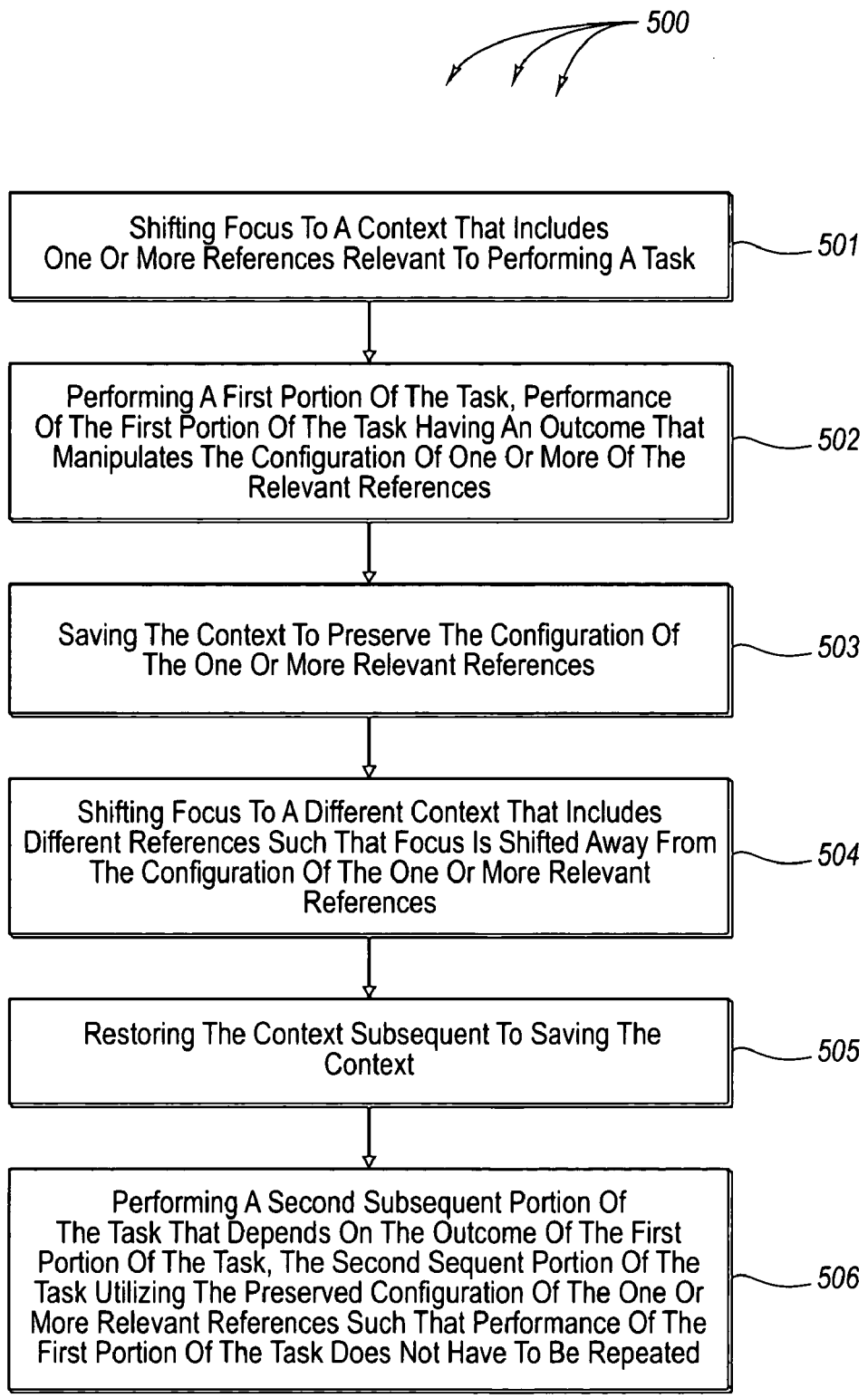
FIG. 5 illustrates an example flow chart of a method for performing a task when focus is shifted off of the task between performance of different portions of the task.

FIG. 5 illustrates an example flow chart of a method 500 for performing a task when focus is shifted off of the task between performance of different portions of the task. The method 500 will be described with respect to computer architecture 100 and activity context 200.

Method 500 includes an act of shifting focus to a context that includes one or more references relevant to performing a task (act 501). For example, a user of computer system can use an input device to shift focus to activity context 200. As previously described, the references depicted in activity context 111 can be some of the references displayed in activity context 200. One or more of the references in activity context 200 can be relevant to the task of determining the total cost of all purchase orders that include product Z. Alternately, for example, in response to some event, context manager can automatically shift focus to activity context 200 (without receiving user input).

Method 500 includes an act of performing a first portion of a task, performance of the first portion of the task having an outcome that manipulates the configuration of one or more of the relevant references (act 502). For example, a first portion of the task of determining the total cost of all purchase orders that include product Z, may be identifying all of the purchase orders that include product Z. Depicted in activity context 200, the identified purchase orders include PO 5006, PO 5022, PO 4987, and PO 4851. Including the identified purchase orders in activity context 200 changes the configuration of the activity context 200 (since these purchase orders were not previously included under the "Purchase Orders" reference).

Method 500 includes an act of saving the context to preserve the configuration of the one or more relevant references (act 503). For example, in response to user-input, context save module 106 can save activity context 200 to storage 151. Alternately, for example, in response to some event, context save module 106 can automatically save activity context 200 (e.g., without receiving user input).

Method 500 includes an act of shifting focus to a different context that includes different references such that focus is shifted away from the configuration of the one or more relevant references (act 504). For example, in response to user input focus can shift from activity context 200 to some other context stored in contexts 157. As a result of the shift in focus, the grouping of the identified purchase orders PO 5006, PO 5022, PO 4987, and PO 4851 depicted in activity context 200 may be wiped from system memory and/or may no longer be displayed. Alternately, for example, in response to some event, context manager 102 can automatically shift focus from activity context 200 to some other context stored in contexts 157 (e.g., without receiving user input).

Method 500 includes an act of restoring the context subsequent to saving the context (act 505). For example, in response to user-input, context restore module can restore activity context 200. Alternately, for example, in response to some event, context restore module 107 can automatically restore activity context 200 (e.g., without receiving user input). Restoring context can include preserving the grouping and configuration of the one or more relevant references. For example, the relationships and arrangements depicted in FIG. 2 can be preserved when activity context 200 is saved.

Method 500 includes an act of performing a second subsequent portion of the task that depends on the outcome of the first portion of the task, the second subsequent portion of the task utilizing the preserved configuration of the one or more relevant references such that performance of the first portion of the task does not have to be repeated (act 506). For example, the total cost of purchase orders PO 5006, PO 50822 PO 4987, and PO 4851 can be calculated from the preserved grouping of purchase orders PO 5006, PO 5022, PO 4987, and PO 4851. The total cost can be calculated without having to re-identify that purchase orders PO 5006, PO 5022, PO 4987, and PO 4851 include product Z.

Thus, a context based work environment generally assists a user in integrating tasks, applications, other users, and remote systems and their corresponding data. As a result, embodiments of the present invention promote more efficient data manipulation at a computer system. Computer system users can flexibly query for references relevant to a context and can add and remove references from a context in accordance with common external behavior that is common across different types of contexts. However, different contexts can have different internal logic that processes references in a different ways, for example, based on context type. Further, embodiments of the present invention can (potentially significantly) reduce the amount of work that has to be re-performed when a worker leaves and then subsequently resumes a task.

FIG. 6 illustrates a suitable operating environment for the principles of the present invention. FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Other peripheral output devices (not shown), such as, for example, speakers and printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 6, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 652, through which computer system 620 receives data from and/or transmits data to external sources. As depicted in FIG. 6, input/output interface 646 and modem 654 facilitate the exchange of data with remote computer system 693 via link 652. Link 652 represents a portion of a network and remote computer system 693 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, modules including content managers, context capture modules, relevance modules, context save modules, context restore modules, context query modules, as well as associated data, including relevance thresholds, reference schemas, references, and relationships can be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system configured to provide a context based work environment that maintains the overall progress towards defined business objectives, each defined business objective involving simultaneous use of a plurality of data entities of various data formats and a plurality of applications, at least one application of the plurality of applications configured for use with data entities of a format incompatible with at least one other of the applications, the computer system including a user-interface and a plurality of applications configured to manipulate data entities, a method for performing different portions of a business objective to progress towards the defined business objective, when focus is shifted away from the business objective between performance of the different portions of the business objective, the method comprising:

an act of loading a context from a storage device into random access memory of the computer system, the context grouping a collection of references for use in performing the business objective, the grouped collection of references spanning a plurality of data entities and a plurality of applications and representing the current progress towards the business objective, at least some of the references identifying data entities being of different data formats configured for use with different applications from among the plurality of applications, the data format of at least one data entity being incompatible with at least one of the plurality of applications such that the at least one application cannot process data entities in the data format;

an act of shifting focus to operate on references contained within the context to further progress towards the business objective, shifting focusing including simultaneously visually presenting each reference in the grouped collection of references to provide efficient access to the spanned plurality of data entities without having to run the plurality of applications corresponding to the plurality of different data formats and even though not all the data entities can be presented in a single application due to data format incompatibilities;

an act of performing a first portion of the business objective, performance of the first portion of the business objective processing the grouped collection of references changing the configuration of the grouped collection of references to further progress towards the business objective;

an act of saving the context including the grouped collection of references from the random access memory of the computer system to the storage device subsequent to the processing to preserve the configuration of references to data entities indicating the further progress towards the business objective after performance of the first portion of the business objective;

an act of shifting focus away from the grouped collection of references contained within the context to operate on a different grouped collection of references contained within a different context, the different grouped collection of references spanning a different plurality of data entities and a different plurality of applications and representing the current progress towards a different business objective, at least one of the different plurality of applications configured for use with data entities of a format incompatible with the plurality of applications, the different grouped collection of references loaded into the random access memory of the computer system, the references contained within the different grouped collection of references being different than the references contained within the grouped collection of references;

an act of wiping the context, including the further progress towards the business objective, from the random access memory of the computer system in response to shifting focus to operate on the references contained in the different context;

an act of subsequently restoring the saved context from the storage device to the random access memory of the computer system in response to detecting a request to progress towards the business objective, the restored context reflecting changed configuration of the grouped collection of references indicating the further progress made towards the business objective from performance of the first portion of the business objective;

an act of shifting focus to the restored context to access the plurality of data entities and plurality of applications after the first portion of the business objective was performed so that additional progress can be made towards the business objective without having to repeat performance the first portion of the business objective; and an act of performing a second subsequent portion of the business objective that depends on the configuration of grouped collection of references from performance of the first portion of the business objective without first repeating performance of the first portion of the business objective.

2. The method as recited in claim 1, wherein the act of shifting focus to operate on the grouping of references in the context comprises an act of shifting user-interface focus in response to user input.

3. The method as recited in claim 1, wherein the act of saving the context to a storage device to preserve the manipulated grouping of references comprises the act of saving the context from system memory to a magnetic or optical disk.

4. The method as recited in claim 1, wherein the act of restoring the context from the storage device comprises an act of loading the context from magnetic or optical disk into system memory.

5. The method as recited in claim 1, wherein shifting focus to operate on references contained within the context to further progress towards the business objective comprises simultaneously visually presenting a grouped collection of references related to a purchase order to provide access to data entities related to the purchase order without having to run a plurality of applications corresponding to a plurality of different data formats of the data entities related to the purchase order.

6. The method as recited in claim 5, wherein shifting focus to operate on references contained within the context to further progress towards the business objective comprises automatically visually presenting a reference to a purchase order to provide access to the purchase order without having to run a purchase order application.

7. The method as recited in claim 6, wherein shifting focus to operate on references contained within the context to further progress towards the business objective further comprises visually presenting a reference to an audio file related to the purchase order to provide access to the audio file without having to run a media player and visually presenting a reference to a contact related to the purchase order to provide access to the contact without having to run a contact viewer.

* * * * *